Nov. 10, 1925.
M. H. RENO
1,560,730
SOUND RECORDATION
Filed Jan. 30, 1922
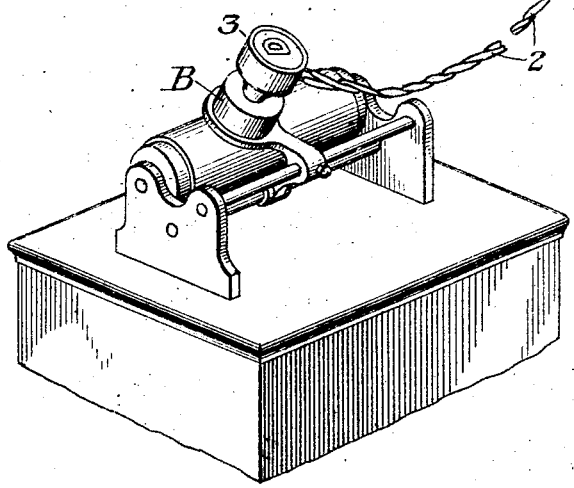
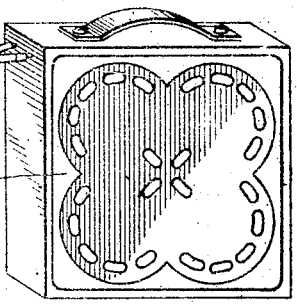
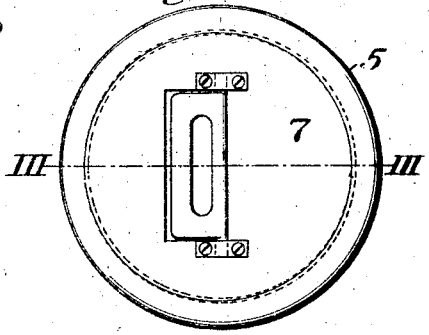
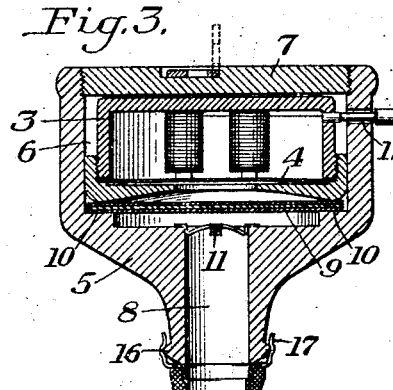
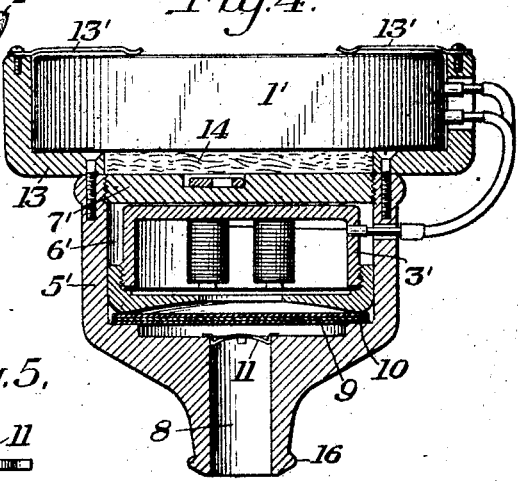
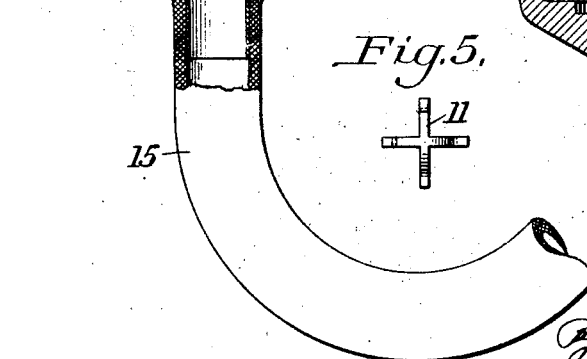
INVENTOR
Marshall H. Reno,
his attys.

Patented Nov. 10, 1925.

1,560,730

UNITED STATES PATENT OFFICE.

MARSHALL H. RENO, OF PITTSBURGH, PENNSYLVANIA; RALPH M. RENO AND ANNIE W. RENO, EXECUTORS OF SAID RENO, ASSIGNORS TO ANNIE W. RENO, OF PITTSBURGH, PENNSYLVANIA.

SOUND RECORDATION.

Application filed January 30, 1922. Serial No. 532,657.

*To all whom it may concern:*

Be it known that I, MARSHALL H. RENO, a citizen of the United States, residing at Pittsburgh, Allegheny County, Pennsylvania, have invented a new and useful Improvement in Sound Recordation, of which the following is a full, clear, and exact description, reference being had to the accompanying drawings, forming part of this specification, in which—

Figure 1 is a perspective view, largely diagrammatic, illustrating one embodiment of the present invention;

Figure 2 is a top plan view of the connector;

Figure 3 is a sectional view on the line III—III of Figure 2;

Figure 4 is a view, corresponding to Figure 3, illustrating a slightly modified form of the present invention, and Figure 5 is an enlarged detail view.

The present invention relates broadly to sound recordation, and more particularly to improved method and apparatus for increasing the efficiency of commercial recording machines.

I am aware that it has heretofore been proposed to couple either the transmitter or the receiver of a telephone, or similar apparatus, to the tube of a commercial recording machine, commonly referred to as a dictaphone, and thereby make it possible to procure permanent records of telephonic and other communications. There have been several objections to devices of this general nature, these objections being due, among other things, to the fact that ordinary telephone receivers and transmitters are not very sensitive and there is no effective method of damping the vibrations of the vibrating element. Also, the means of connecting the sound producing device to the recording machine has not proven very efficient.

The present invention embodies several important features overcoming the recordation of rasping, raucous sounds, such as produced by loud voices or certain notes capable of setting up interfering vibrations, either sympathetic or otherwise, and provides a more sensitive apparatus whereby recordation of either telephonic messages, conversation or dictation is facilitated. Referring more particularly to Figure 1 of the drawing, there is diagrammatically illustrated an electrically operated sound concentrating and amplifying device 1. This device is preferably of the nature ordinarily used by deaf people and referred to as an acousticon, this type of instrument having been found highly efficient due to its sensitiveness and accurate sound wave transmission. The acousticon is connected in any desired manner, as by a cable or cables 2 with either one or a plurality of receivers 3. These receivers are preferably of the type usually supplied for use as ear pieces in connection with the acousticon. The receivers in turn are adapted to mechanically transmit, by means of diaphragms 4, the vibrations electrically transmitted thereto from the acousticon. These vibrations are transmitted through a suitable tubular conducting member to the recording diaphragm containing box B of a commercial recording machine such as the dictaphone.

The present invention provides an efficient means for connecting the receiver with the dictaphone. This connection may comprise a suitably shaped casing 5 of any desired material having an enlarged cup-shaped upper end 6 adapted to receive the receiver 3. The receiver may be held in place by a suitable closure 7. Communicating with the chamber 6 is a tubular passage 8 which passage is of such diameter that it may be easily slipped directly on to the tubular sleeve provided on the box B of the dictaphone. I have found that unless some sound modifying or modulating means is provided, sound will be recorded in such manner as to make its subsequent transcription difficult or unpleasant. In order to prevent the transmission of harsh sounds, I provide a sound modifying and modulating means within the casing 5. In the form of the invention illustrated, this means comprises a series of independent diaphragms 9 supported for free vibration on the shoulders 10 and clamped in position between the receiver and the shoulder. The passage 8 is preferably closed at its upper end by a suitably shaped grid 11, which prevents undue distortion of the diaphragms 9, which diaphragms are preferably of material having sound modifying or modulating characteristics, such as mica. The casing 5 may also be provided with openings 12 permitting electrical connection to easily be made, by the use of detachable plugs, with the receiver.

I have found that with an apparatus of this character it is possible to place the acousticon at any desired point in a room and accurately record conversation, dictation or the like without speaking directly into the acousticon.

In Figure 4 there is illustrated a slightly modified form of apparatus in which parts corresponding to the parts already described are indicated by the same reference characters having a prime affixed thereto. In this construction the acousticon 1' is held in position within a supplemental casing 13, suitably attached to the casing 5' in any desired manner. If desired, spring clips 13' may be provided for holding the acousticon in position. Preferably, with an apparatus of this character, there will be provided suitable cushioning material, such as felt 14 between the acousticon and the closure 7'. It will be apparent that battery connection may be made with the acousticon 1' in any desired manner, or the acousticon may be built with a self-contained battery.

In certain cases it is desirable to record speeches and transcribe the same almost immediately. Where this is the case, the acousticon may be connected to a plurality of receivers 3, each of which cooperates with a different dictaphone. In this manner, it will be possible to use first one of the dictaphones and record a certain amount of the speech thereon, and, just before stopping the first dictaphone, put a second dictaphone in operation, and so on, using one dictaphone after the other in succession, with a short period of overlap in the operation of a preceding dictaphone with that of a succeeding one so as to insure recording of the entire speech, new records being substituted for the used records as each dictaphone is taken out of operation. This permits transcription of the record from the dictaphone substantially simultaneously with its recordation.

In other instances, it may be desirable to retain the usual tube 15 which is provided for use with dictaphones. In order to permit this operation, the casings 5 may be formed with a peripheral bead 16 adapted to cooperate with the spring fingers 17 usually provided to receive the glass mouth piece of the dictaphone.

The advantages of the present invention arise from the method herein disclosed facilitating the recordation of sound, improving the efficiency of the recording apparatus, and obviating the recordation of undesirable sounds.

A further advantage of the present invention, inherent in the use of the acousticon, arises from the fact that an acousticon of standard construction may, if desired, be carried about either in the hand or attached to the clothes of the person dictating, whereby freedom of movement is permitted and accurate recordation insured.

I claim:

1. In a device for recording sound, means for recording sound waves, means detachably connected to said recording means for mechanically transmitting sound waves thereto, means carried by said transmitting means for modulating the transmission of the sound waves, an electrical receiving instrument carried by said transmitting means in cooperative relation therewith, and means for electrically energizing said receiving instrument, substantially as described.

2. In a device for recording sound, means for recording sound waves, means detachably connected to said recording means for mechanically transmitting sound waves thereto, means carried by said transmitting means for modulating the transmission of the sound waves, an electrical receiving instrument carried by said transmitting means in cooperative relation therewith, detachable means for clamping said receiving instrument and modulating means in position, and means for electrically energizing said receiving instrument, substantially as described.

3. In a sound recording apparatus, a connector having means for detachably cooperating with a commercial sound recording machine, and having means for detachably supporting and clamping in position a sensitive receiver, substantially as described.

4. In a sound recording apparatus, a connector having means for detachably cooperating with a commercial sound recording machine and means for detachably supporting and clamping in position a sensitive receiver, and sound modifying means in said connector, substantially as described.

In testimony whereof I have hereunto set my hand.

MARSHALL H. RENO.